UNITED STATES PATENT OFFICE.

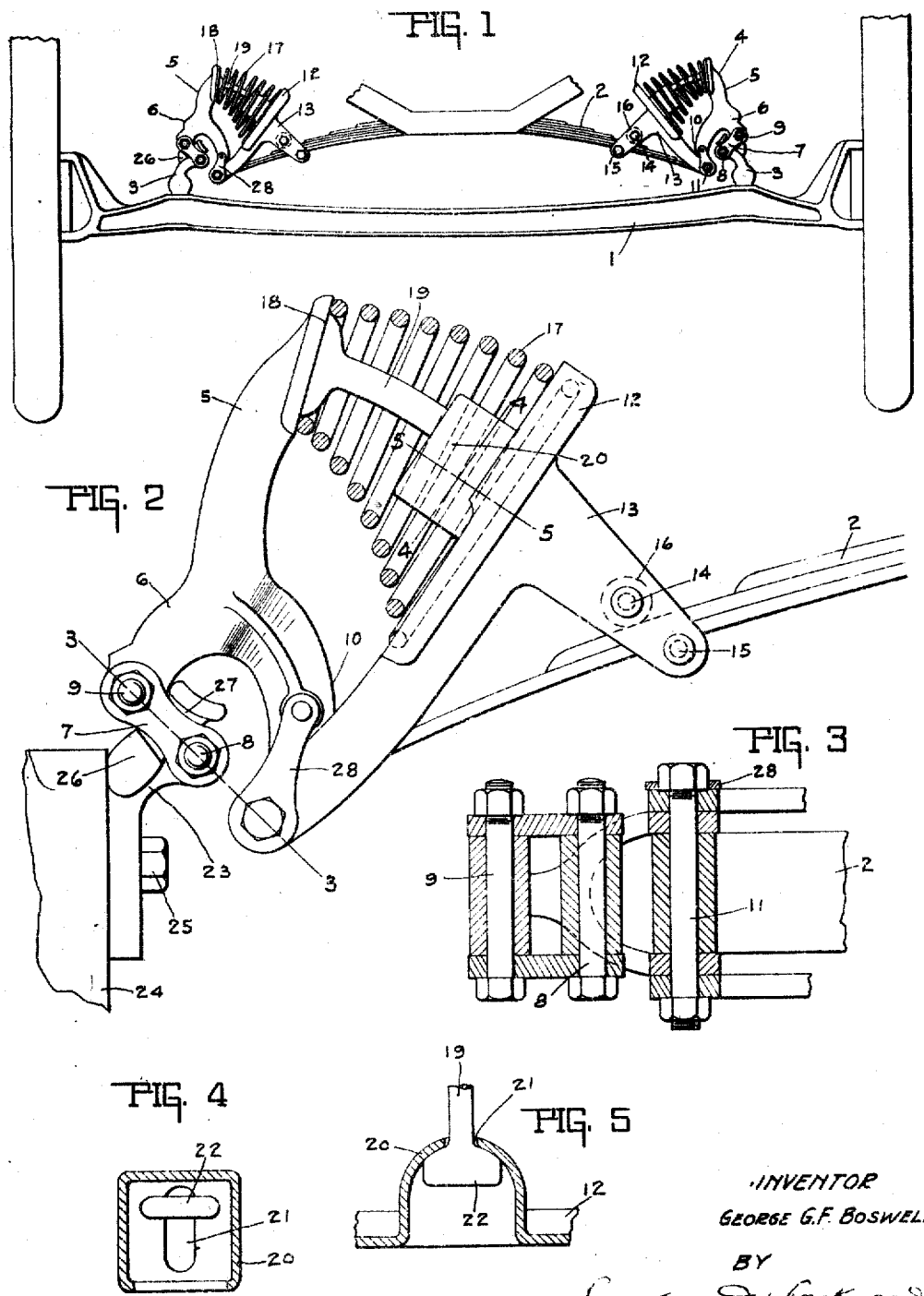

GEORGE G. F. BOSWELL, OF INDIANAPOLIS, INDIANA.

SHOCK-ABSORBER.

1,323,820.  Specification of Letters Patent.  Patented Dec. 2, 1919.

Application filed May 3, 1918. Serial No. 232,243.

*To all whom it may concern:*

Be it known that I, GEORGE G. F. BOSWELL, a citizen of the United States, and a resident of Indianapolis, county of Marion, and State of Indiana, have invented a certain new and useful Shock-Absorber; and I do hereby declare that the following is a full, clear, and exact description thereof, reference being had to the accompanying drawings, in which like numerals refer to like parts.

This invention relates to shock absorbers for vehicles and it is designed primarily for use in connection with Ford automobiles and trucks, although it will be understood that the same may be used in connection with any make of machine or truck. The prime object of the invention is in providing means for suspending the usual form of body spring direct from the shock absorber instead of from the usual form of brackets now commonly employed so that any shock delivered to the wheels of the vehicle will be absorbed by the shock absorber before reaching the body springs.

A further feature of the invention is the provision of means for adjustably suspending the shock absorber shackle from the usual form of bracket now employed for suspending the body springs. A further feature of the invention is the provision of springs between the parts of the shock absorber for controlling the hinging or pivotal movement of said parts.

A further feature of the invention is the provision of means for limiting the swinging movement of one part of the shock absorber with the other part thereof, and a further feature of the invention is the provision of means for retaining parts of the shock absorber in alinement with and in juxta-position to the body spring.

A further feature of the invention is in so connecting the parts of the shock absorber and the body spring, that any side thrust of the body and body spring will be directed against and taken up by the spring of the shock absorber.

The full nature of the invention will be understood from the accompanying drawings and the following description and claims.

In the drawings, Figure 1 is an elevation of the front axle and body spring of a Ford automobile showing my improved shock absorber as applied thereto. Fig. 2 is an enlarged sectional view showing the manner of attaching one of the shock absorbers to the rear body spring and brake drum of the vehicle. Fig. 3 is a sectional view as seen on line 3—3 of Fig. 2. Fig. 4 is a sectional view as seen on the line 4—4 of Fig. 2. Fig. 5 is a sectional view as seen on the line 5—5 of Fig. 2.

In the accompanying drawings 1 indicates the forward axle of an automobile which in this instance is of the Ford variety and 2 indicates the body spring, while 3 indicates the usual form of bracket employed for supporting the body spring. Instead, however, of attaching the ends of the body spring to the bracket, a shock absorber 4 is introduced between the brackets and the ends of the body spring, each shock absorber comprising a shackle 5 which has an arm 6 between its ends which is pivotally attached to the upper ends of the brackets 3 by means of links 7, bolts 8 and 9 being extended respectively through the bracket 3 and arm 6 and through the ends of the links 7. The lower end of the shackle 5 is bifurcated to form a yoke 10 which receives the end of the body spring 2, a bolt 11 extending transversely through the ends of the yoke and the body spring.

Coöperating with the shackle 5 is a base member 12 which has an angular extension 13, one arm of which is bifurcated and straddles the yoke 10 and the end of the spring 2, the bolt 11 being passed through the bifurcated end of the extension and thereby pivotally connecting the base member with the shackle. The other arm of the angular extension is likewise bifurcated and straddles the body spring 2, bolts 14 and 15 being extended through the latter bifurcated end, one above and one below the spring, thereby holding the base member and, in fact, the entire shock absorber, in proper alinement and juxta-position to the body spring. In order to reduce friction on the body spring, a bearing roller 16 may be introduced around the bolt 14 so as to bear on the upper surface of the body spring.

Mounted upon the base member 12 is a helical spring 17, the upper reduced end of which engages a shoulder 18 on the upper end of the shackle 5. A shank 19 projects from the shoulder 18 downward through the spring 17 and assists in holding the spring in position, the lower end of the shank being passed through a housing 20 on the base member 12, thus forming a connection between the shackle 5 and the base member. In order to permit a free movement of the shackle independently of the base member 12, the housing 20 is provided with an elongated slot 21 through which the shank 19 extends and in order to limit the separating movement between the shackle and base member, the lower end of the shank 19 is provided with a cross head 22 which normally extends at right angles to the longitudinal trend of the slot 21, as shown in Figs. 4 and 5, thereby preventing the shank from entirely leaving or disengaging from the housing.

In assembling the shackle and the base member preparatory to attaching them to the body spring and bracket, one of these members is turned at right angles to the other and the cross head then introduced through the slot, after which the two parts are brought into proper alinement, thereby disposing the cross head at right angles to the slot and while permitting free movement toward each other, limits the separating movement between the shackle and base member.

As shown in Fig. 2, instead of attaching the supporting bracket for the rear spring 2 to the axle, a bracket 23 is attached to the brake drum 24 through the medium of a bolt 25, the lower end of the shackle 5 being attached to said bracket by the links 7 and bolts 8 and 9. In order to hold the shackles in fixed position, as against the end thrusts of the body springs and at the same time permit pivotal movement thereof, a locking clamp 26 is introduced between the pivotal end of the supporting brackets and the pivotal ends of the arms 6, the links 7 passing on opposite sides of the locking clamp and through recesses 27 in the edges of the locking clamp and when the links are properly attached to the supporting brackets and ends of the arms, they will be securely held against pivotal movement on the brackets while the arms 6 and shackles to which they are attached are free to pivot on the bolts 9. These locking clamps are to be so constructed as to position the pivotal ends of the arms 6 at various degrees of angle between the vertical and horizontal planes through the axis of the bolts 8. The shackles 5, as for example, when the shock absorbers are used in connection with pleasure cars or those carrying light loads where considerable resiliency is required, are positioned as shown in Figs. 1 and 2, but when heavier loads are being carried and less resiliency of the springs is required the links 7 are brought to substantially vertical position so as to dispose the bolts 9 substantially directly above the bolts 8, thereby requiring a heavier load upon the body springs to cause pivotal action between the parts of the shock absorber.

To prevent the bolt 11 from rotation independently of the movement of the shackle 5 a locking plate 28 is attached to one face of the yoke 10 and has its opposite end provided with an opening 29 which fits over the head of the bolt 11 and prevents rotation thereof with respect to the yoke.

In attaching this form of shock absorber to a vehicle, the bolts employed for securing the body springs 2 to the links 7 are removed and the links then swung upwardly and attached to the arm 6. The ends of the body spring 2 are then brought into registration with the openings through the ends of the angular extension 13 and the yoke 10 and through the openings in these parts are introduced the bolts 11, thereby permanently securing the shock absorbers to the body spring. The vertical portions of the angular extensions are then brought into engagement with the body springs and lowered until the rollers 16 are resting upon the upper faces of the spring, and the bolts 15 are then introduced through the lower ends of the vertical portions of the angular extensions and below the body spring, the bolts and rollers holding the shock absorbers in proper alinement and in engagement with the body springs.

With this form of structure, none of the parts of the vehicle have to be changed in order to attach the shock absorber as the same brackets in their original positions and the links employed for attaching the body spring thereto are employed for attaching the shock absorbers to the brackets. It will likewise be seen that the outward swinging movement of the shackles with respect to the base portion 12 will be limited through the medium of the shackle 19 and the head 22 thereon engaging with the housing 20. It will likewise be seen that by providing the locking clamps in different lengths, the shock absorbers can be arranged to carry lighter or heavier loads as occasion may require.

By pivoting the end of the shackle and base member and also the end of the body spring together and from the same bolt, any end thrust on the body spring, caused by the side movement of the car body, will be entirely taken up by the spring 17 as the end movement of the body spring will cause the same action on the shock absorber as a vertical movement of the body spring.

This action therefore eliminates the casual lateral swinging movement of the car body and when lateral movement is imparted, which results only under extreme conditions, no jar or jerking action results as it is taken up by the shock absorber spring.

The invention claimed is:

1. The combination with the body springs of a vehicle, and supporting brackets carried by parts of the vehicle, of shock absorbers comprising base portions and shackle portions, a single means for pivotally attaching the base portions, shackle portions and the ends of the springs together, a spring between the opposite ends of said base and shackle portions, means carried by the shackle portions adapted to engage parts of the base portions to limit the outward swinging movement of the shackle portions, and means to adjustably attach the shackle portion to the brackets.

2. The combination with a body spring of a vehicle, of a shock absorber including a base portion, a shackle member, a spring coöperating with the base portion and shackle member, and means for pivotally connecting said base portion, shackle member and one end of the body spring together.

3. The combination with supporting brackets of a vehicle, of shock absorbers, each comprising a shackle portion and a base portion, a single means for pivotally attaching the base portion and shackle portion together and to the body spring of the vehicle, and means to adjustably and pivotally attach the shackle to the bracket of the vehicle to adapt the shock absorber for carrying different weights.

4. The combination with a body spring of a vehicle, of a shock absorber including a base portion resting upon and having floating action upon said body spring, a shackle portion pivotally mounted at one end, a spring between the base portion and the opposite end of the shackle portion, and means for connecting said base portion, shackle portion and the end of the body spring together for causing said parts to act in concert.

5. The combination with the supporting brackets and body springs of a vehicle, of shock absorbers, each comprising a base member, a shackle coöperating therewith, a single means for pivotally attaching the base member, shackle and the body spring together, means to pivotally attach the shackle to the bracket, means carried by the shackle for engagement with the base member to limit the outward swinging movement of the shackle with respect to the base member, and yielding means between the base member and shackle.

6. The combination with the body spring of a vehicle, and a supporting bracket carried by parts of the vehicle, of a shock absorber including a base portion and a shackle portion, means for pivoting said base portion, shackle portion and spring together, a spring between the base and shackle portions, and means for pivotally attaching the shackle portion to the bracket.

7. The combination with the body spring of a vehicle, and a supporting bracket carried by parts of the vehicle, of a shock absorber comprising a base portion and a shackle portion, said base and shackle having extensions, means for pivoting said extensions and the end of the body spring together, a spring between the base and shackle portions, and means for pivotally attaching the shackle portion to the bracket.

8. The combination with supporting brackets and body springs of a vehicle, of shock absorbers interposed between said brackets and body springs, each comprising a base member having an angular extension, a shackle, one end of which is pivotally attached to one end of an angular extension, means to hold the base member in alinement with said body spring, means carried by the shackle adapted to engage parts of the base member for limiting the outward swinging movement of the shackle, links attached at one end to the shackle and at their opposite ends to the bracket of said vehicle, and means between the links, bracket and the pivotal end of the shackle for holding the shackle in adjusted position upon the bracket.

9. The combination with the body spring of a vehicle, of a shock absorber comprising a base member and a shackle, means to pivotally attach the base member, shackle and one end of the body spring together, and means on said shackle for engagement with the pivotal means for the shackle and base member to prevent rotation of the pivotal means independently of the shackle.

10. The combination with the body spring of a vehicle and supporting brackets carried by parts of the vehicle, of shock absorbers each comprising a base portion, a shackle portion, a spring between one end of the base member and shackle, means to pivotally connect the opposite ends of said base and shackle and one end of the body spring together, and means for pivoting the shackle to a supporting bracket in such manner that an end thrust of the body spring will be received against and taken up by the spring of the shock absorber.

11. A shock absorber construction for vehicles, including a base member, a housing projecting upwardly from the base member, the closed end of said housing having an elongated narrow slot therethrough, a shackle for coöperation with said base member, a coiled spring between said base member and shackle and surrounding said housing, and means for holding the base member, spring and shackle in assembled formation while being attached to parts of the vehicle, comprising a shank integral with said shackle, and a transversely extending head at the free end of said shank adapted to pass through said slot when the shackle is turned at right angles to its normal position and to engage the closed end of the housing when the shackle is turned to its normal position and limit the outward movement of said shackle.

12. The combination with a supporting bracket of a vehicle, of a shock absorber, means for pivotally connecting the shock absorber with the bracket, and a locking clamp resting upon said bracket between the bracket and the pivot end of the shock absorber, said locking clamp holding the shock absorber in adjusted relation with the bracket whereby said shock absorber may be positioned for carrying different weights.

In witness whereof I have hereunto affixed my signature.

GEORGE G. F. BOSWELL.